United States Patent [19]

Bascom et al.

[11] Patent Number: 4,918,853

[45] Date of Patent: Apr. 24, 1990

[54] PORTABLE, COLLAPSIBLE ICE FISHING DEVICE

[76] Inventors: Charles A. Bascom; Betty A. Bascom, both of R.R. #1, Box 37, Elmira, Mich. 49730

[21] Appl. No.: 293,762

[22] Filed: Jan. 5, 1989

[51] Int. Cl.⁵ .............................................. A01K 97/08
[52] U.S. Cl. ............................................. 43/26; 43/4;
  43/54.1; 280/28.12; 280/19.1; 297/188;
  135/901
[58] Field of Search ................ 43/4, 26, 54.1;
  280/19.1, 28.12, 20; 135/901; 297/184, 188;
  52/36; 220/20; 224/920; 206/315.11

[56] References Cited

U.S. PATENT DOCUMENTS

| | | | |
|---|---|---|---|
| 2,555,073 | 5/1951 | Zdankoaki | 297/188 |
| 2,632,454 | 3/1953 | Skogen | 135/901 |
| 2,681,809 | 6/1954 | Hamill | 280/28.12 |
| 3,017,194 | 1/1962 | Anderson | 280/19.1 |
| 3,030,122 | 4/1962 | Madera | 280/28.12 |
| 3,173,436 | 3/1965 | Peters | 135/5 |
| 3,436,119 | 4/1969 | Lehmann | 280/79.1 |
| 3,971,395 | 7/1976 | Lipinski | 135/901 |
| 4,428,139 | 1/1984 | Henze | 43/20 |
| 4,438,940 | 3/1984 | Hunt . | |

FOREIGN PATENT DOCUMENTS 320161  2/1970  Sweden ................................ 135/901

Primary Examiner—Kurt Rowan
Attorney, Agent, or Firm—Terry M. Gernstein

[57] ABSTRACT

A portable, collapsible ice fishing device includes a monolithic frame that has a seat section and a storage section and is adapted to be straddled. The storage section has two doors on which ice fishing reel elements, bobber elements and line brake elements are mounted. The doors are pivotably mounted and are adapted to swing from a downward direction to an upright position. The doors are held in the upright position by a rod. The device also includes peg and peg receiving holes in the reel elements for "remembering" the amount of fishing line fed off of the reel elements.

14 Claims, 1 Drawing Sheet

PORTABLE, COLLAPSIBLE ICE FISHING DEVICE

TECHNICAL FIELD OF THE INVENTION

The present invention relates in general to the field of fishing, and to ice fishing in particular.

BACKGROUND OF THE INVENTION

Fishing in general, and ice fishing in particular, has undergone a tremendous increase in popularity in recent times. As is well known to ice fisherman, it is often difficult to reach an ideal spot for setting up. Some spots are so remote as to be several miles from shore. If the ice fisherman is required to carry a heavy and bulky enclosure as well as all of his equipment, he may even be required to travel by motor vehicle. Accordingly, it has been proposed that only when the ice is strong enough to support such a motor vehicle can the more remote spots be reached.

Accordingly, the design of ice fishing enclosures has accounted for this demand, see, for example, the enclosures disclosed in U.S. Pat. Nos. 3,173,436 and 4,438,940. While such devices are successful in the objects of providing an enclosure that is easily transported, they do not account for the situation where the ice fisherman merely needs to have a convenient means of transporting his equipment and having a comfortable seat. This situation is encountered when the weather is not so inclement, or the spot is so remote that an enclosure either is not needed or is simply more trouble than it is worth.

Still further, such known shelters may be expensive and still may not provide a convenient, easy-to-use means for supporting the actual fishing equipment, such as the reels and the like.

Still further, once set up, the device should be easily knocked down since collapsing the device is often done at the end of the fishing and is an otherwise onerous task.

Accordingly, there is need for a device that adds flexibility to the known devices, such as the collapsible enclosures presently available, while also being easy and inexpensive to use. Objects It is a main object of the present invention to provide an ice fishing device that is easily transported, erected and collapsed while still providing for the fisherman's comfort.

It is another object of the present invention to provide an ice fishing device that can be used in conjunction with an ice fishing enclosure.

It is another object of the present invention to provide an ice fishing device that is easily manufactured.

It is another object of the present invention to provide an ice fishing device that is easily stored, and makes storage of ice fishing equipment easy and convenient.

SUMMARY OF THE INVENTION

These, and objects, are achieved by a collapsible ice fishing device that is mounted on skids to be easily transported over snow and ice, and includes ice fishing reels and bobbers that are easily moved into a set up configuration. The device includes a frame that is stair stepped in shape and which is designed to be straddled by the fisherman. The device is hollow whereby storage capacity is provided, and when set up, exposes the fishing equipment to easy access.

The device can be used as a seat inside enclosures such as those disclosed in the aforementioned patents, or it can be used separately.

The device also includes pegs and peg-receiving holes in the fishing reel elements which are arranged so that fishing line will wind over the reel mounted pegs when the line is being reeled in whereby the amount of line fed out will be "remembered".

DETAILED DESCRIPTION OF THE PREFERRED EMBODIMENT

Figure 1:
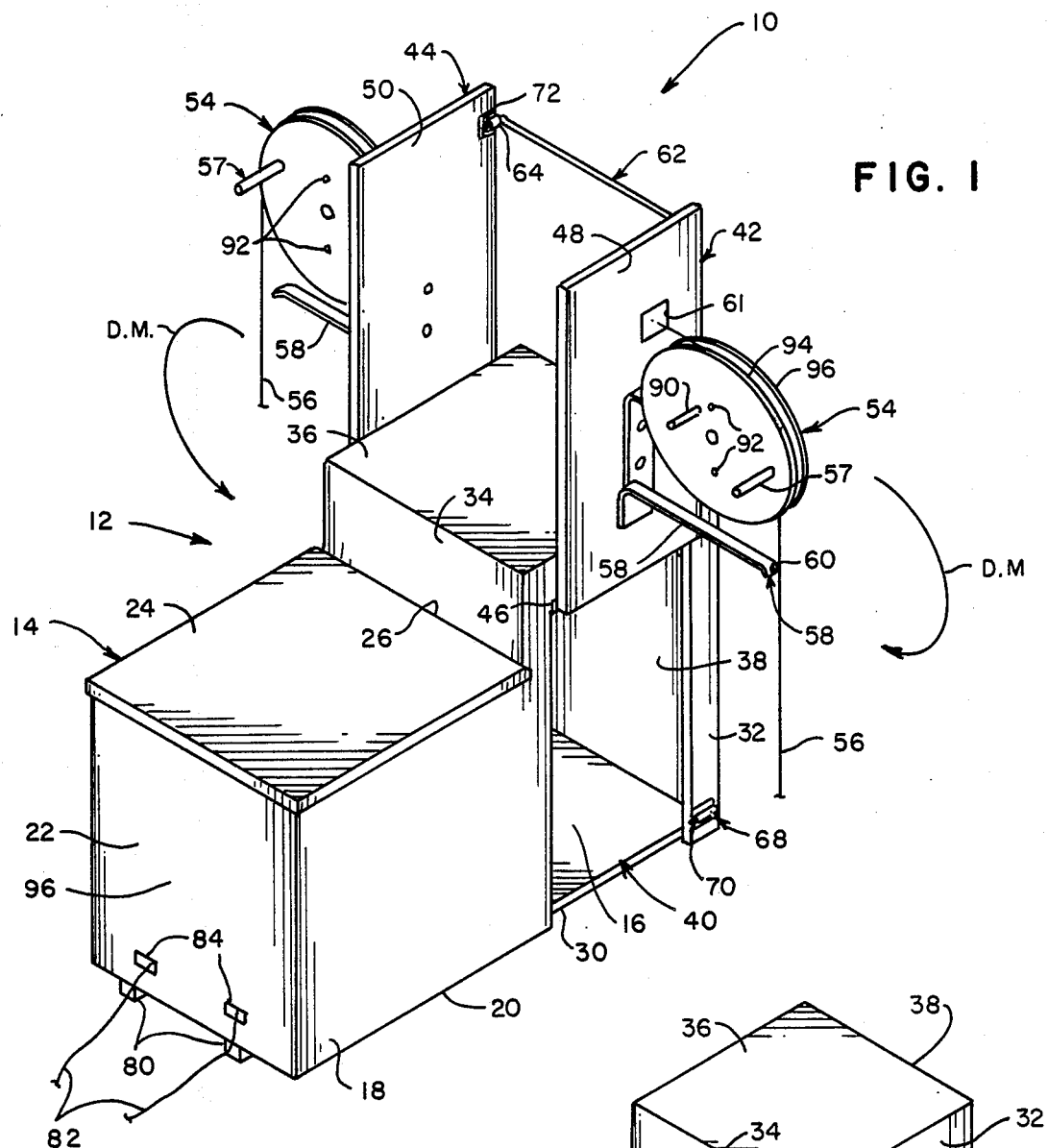
FIG. 1 is a perspective view of the ice fishing device in the set-up condition.

Shown in FIG. 1 is a portable, collapsible ice fishing device 10 that can be used in one configuration for carrying and storing goods such as are commonly used by an ice fisherman, and is used as a seat and as a support for fishing equipment in another configuration.

As can be seen in FIG. 1, the device 10 includes a frame 12 that is monolithic for ease of manufacture as well as for strength. The frame 12 is divided into a hollow seat section 14 and a hollow storage section 16 which are interconnected to provide storage space for the fisherman's equipment.

The seat section includes side walls, such as side wall 18 extending upwardly from a bottom 20 to a height that is convenient for sitting during an ice fishing operation, a rear wall 22 and a seat portion 24. The seat section 14 is sized to have a width as measured between the side walls 18 that is convenient and comfortable for a fisherman who is sitting on the seat with the device 10 oriented to have its longitudinal centerline as measured from the rear wall 22 extending between his legs in the posterior/anterior direction with respect to the fisherman so that the storage section rear wall 22 is located posteriorly and the seat 24 includes a forward edge 26 that is located anteriorly of the fisherman.

The storage section 16 includes a bottom 30 that is coplanar with the seat section bottom 20 and two side walls, such as side wall 32, that are continuations of the seat section side walls 18 and which extend upwardly from the storage section bottom to a height that exceeds the height of the seat section to define a stair-step like appearance of the device 10. The storage section also includes a rear wall 34 located adjacent to the seat front edge 26, and a top 36. A front wall 38 completes the enclosure of the storage section.

Each storage section side wall 32 has a door opening, such as door opening 40, defined therein to provide access to the interior of the device. Doors 42 and 44 are attached on the side walls 32 by hinge means 46, that can resemble a piano hinge, so that the doors can swing about such hinge as will be discussed below.

Each door includes an inside surface, such as inside surface 48 on door 42, that is located inside the storage section when the door is closed, and an outside surface, such as outside surface 50 on door 44, that is located outside the device when the device is closed.

Figure 2:
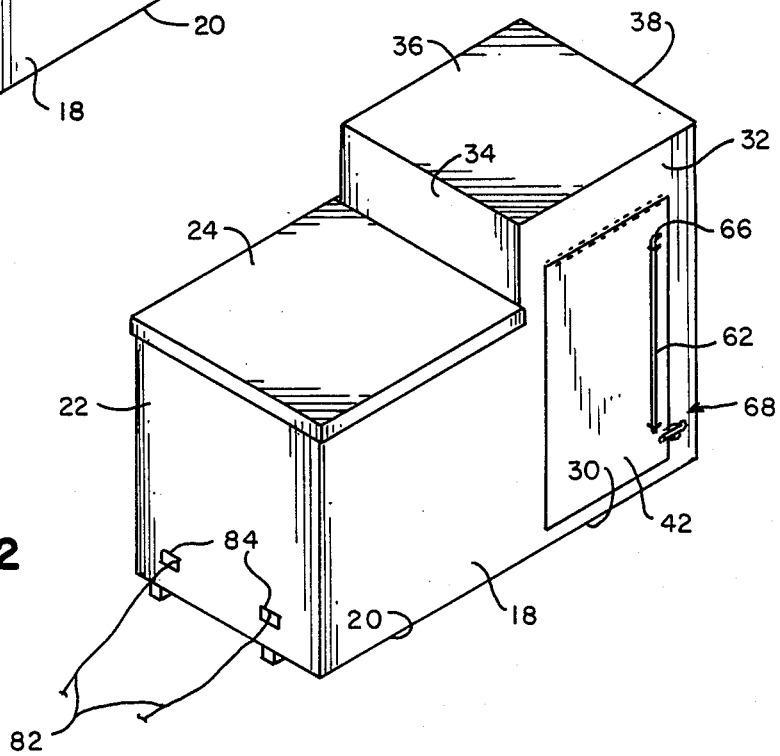
FIG. 2 is a perspective view of the ice fishing device in the collapsed condition.

As can be seen by comparing FIGS. 1 and 2, the doors are adapted to swing from a first position in FIG. 2 covering the door openings to a second position 180° therefrom as shown in FIG. 1. In the first position, the door inside surfaces 48 are presented towards each other, and in the second position, the door inside surfaces are facing away from each other and outwardly of the device while the door outside surfaces are presented towards each other and are facing each other. The second position is upright and extends above the top 36 of the storage section, while the first position has the doors hanging pendently downwardly from the hinge means. The closing movement of the doors is indicated in FIG. 1 by the arrows DM, and moves the doors from the FIG. 1 upright second position back to the FIG. 2 pendently supported closed position.

Mounted on the inside surface of each door is a fishing reel element 54 from which fishing line 56 is fed out and reeled in by turning the reel element by means of a handle 57 mounted on the reel element The device 10 also includes a flexible bobber element 58 mounted on each door inside surface subadjacent to the reel element. The flexible bobber element can be plastic, and includes a means 60 for connecting the fishing line 56 to the bobber element to signal the fisherman that a fish has struck. The connection means 60 is preferably a slot through which the line 56 is fed, but could be any other connection means.

Also included is a fishing line brake means 61 mounted on each of the doors in a location to contact the fishing line on the reel elements 54 to control such line.

The doors 42 and 44 are held in the open, FIG. 1, position by a connecting rod 62 that is pivotably mounted on the outside surface 50 of the door 42 to move from a stored condition shown in FIG. 2 to a set-up condition shown in FIG. 1. The door 44 includes a rod attaching means 64 mounted on the outside surface 50 of that door. The rod 62 preferably includes a reverse bend 66 on the end thereof which is remote from the pivotal attachment to the door 42 and the rod attaching means 64 is then preferably a simple hook through which the rod reverse bend fits. As can be seen in FIG. 1, the rod and its attaching means are located to be above the storage section top 36 in the FIG. 1 set up condition of the device. The rod and the attaching means are easily used and will securely hold the doors in the FIG. 1 set-up condition.

In the preferred embodiment, each door includes a latch mechanism 68 for locking the door to the storage section side wall. Each of the latch mechanisms includes a side wall mounted sliding bolt 70 and a door mounted keeper 72. However, it is to be noted that other means for attaching the doors to the storage section side walls can be used without departing from the scope of the present disclosure.

In order to make the device 10 easily transportable over ice and snow, the device includes sled runner-like skid means 80 on the bottom thereof. The skid means extends for essentially the entire longitudinal length of the device from the seat section rear wall 22 to the storage section front wall 38, and can be formed of any suitable material, such as stainless steel or the like. While the skid means are shown as being rectangular, these elements can be any suitable shape as will occur to one skilled in the art based on the foregoing disclosure.

The device is pulled along by attaching means, such as straps 82, to the seat section rear wall 22 at an attaching means 84, such as a strap anchor or the like. The straps can be attached to any convenient means of pulling the device, such as a motor vehicle or the like.

A fisherman often desires to remember the exact depth of a fish strike, and thus the device 10 includes a means for "remembering" this depth. This means includes pegs, such as peg 90, that are each removably inserted into aligned pairs of a plurality of peg receiving holes 92 defined in each reel element 54. The pairs of peg receiving holes each include one hole in one flange 94 of the reel element and another hole in the other flange 96 of the reel element, with corresponding holes in the flanges being axially aligned so the peg will extend completely through the reel element and be supported by the flanges thereof.

After the line 56 has been fed out to a desired depth, the pegs 90 can be inserted through the reel elements 54 via the holes 92 and the line will rest on top of these pegs. When the line is reeled in, it will wind over the pegs, and thus the exact amount of line fed out will be "remembered".

The device 10 can also include a light-emitting means, such as fluorescent paint, a phosphorescent paint, or the like for making the device and the fisherman using it easy to spot, especially in a monochromatic landscape. The light-emitting means is indicated in FIG. 1 by surface layer 96.

The device can be of several different sizes, and can be large enough to store a sizable lantern along with other fishing gear if suitable. The exact size of the device will be within the teaching of the present disclosure and thus the inventor will not disclose exact sizes since one skilled in the art will be able to decide what size is most desirable based on the foregoing disclosure.

It is to be understood that while certain forms of the present invention have been illustrated and described herein, it is not to be limited to the specific forms or arrangement of parts described and shown.

We claim:

1. A portable, collapsible ice fishing device for carrying and storing goods in one configuration and for supporting a fisherman and his equipment in another configuration, comprising:

(A) a monolithic frame having
  (i) a hollow seat section which is adapted to store goods and which comprises
    (a) side walls,
    (b) a bottom, and
    (c) a seat portion on which a fisherman sits,
    the seat section being sized to fit between the fisherman's legs and extend in the posterior-/anterior direction with respect to such fisherman when he sits on the seat portion in straddle-fashion;
  (ii) a hollow storage section which is adapted to store goods and which comprises
    (a) a front wall,
    (b) a rear wall located adjacent to said seat portion,
    (c) two side walls each forming a continuation of one of said seat section side walls,
    (d) a bottom,
    (e) each storage section side wall having a door opening defined therein for providing access inside the frame,
    (f) a door hingeably attached to each storage section side wall go cover the door opening in such side wall, each door having an inside surface which is located inside the storage section when the door is closed to face the inside surface of the other door, and an outside surface that is outside the storage section when the door is closed to face in a direction opposite to the outside surface of the other door, (g) hinge means hingeably connecting each door to a storage section side wall and permitting such hingeably connected door to swing from a first position covering the door opening associated therewith with the door inside surface facing towards the inside of the storage section and towards the inside surface of the other door 180° to a second position which is upright with respect to the storage section bottom and with the door inside surface facing outwardly with respect to the storage section inside and in a direction opposite to the inside surface of the other door so that the door outside surfaces face each other, (h) a top surface on said storage section, with the doors extending above said top surface in the second position, (i) a fishing reel element mounted on the inside surface of each door, (j) a flexible bobber element mounted on the inside surface of each door to be adjacent to the fishing reel mounted on such door, (k) a connecting rod pivotably mounted on the outside surface of one of said doors, (l) rod attaching means mounted on the outside surface of the other door to releasably affix the connecting rod to such other door and connect the doors together, said rod and said rod attaching means being located to be positioned above the storage section top surface when the doors are in the second position, (m) a closure latch element mounted on each door, and (n) a closure latch receiving element mounted on each storage section side wall to receive the closure latch element associated therewith;

(iii) means connecting the inside of the hollow storage section to the inside of the hollow seat section; and (B) skid means mounted on the seat section bottom and storage section bottom for facilitating the sliding movement of said frame over ice and snow.

2. The device defined in claim 1 wherein said seat section further includes a rear wall that is located posteriorly of the fisherman when he sits on the seat section and a front edge that is located anteriorly of the fisherman when he sits on the seat section.

3. The device defined in claim 2 wherein said storage section rear wall is located adjacent to said seat section front edge.

4. The device defined in claim 3 wherein said storage section top is located above said seat section seat so the frame has a stair step like shape.

5. The device defined in claim 4 wherein each bobber element has means for attaching such bobber element to a fishing line that is reeled off of the adjacent fishing reel element.

6. The device defined in claim 5 wherein each fishing reel element includes memory means for remembering the exact depth to which fishing line has been dispensed.

7. The device defined in claim 6 wherein said memory means includes a peg removably located in a hole defined in each fishing reel.

8. The device defined in claim 7 wherein each fishing reel element includes a handle.

9. The device defined in claim 8 further including light-emitting means on said frame.

10. The device defined in claim 9 wherein said light-emitting means includes fluorescent paint.

11. The device defined in claim 9 wherein said light-emitting means includes phosphorescent paint.

12. The device defined in claim 11 wherein said handles are located on said fishing reel elements to extend toward said seat section to be grasped by a fisherman sitting on said seat section.

13. The device defined in claim 12 further including strap attaching means on said frame.

14. The device defined in claim 13 further including a fishing line brake mounted on each door adjacent to each fishing reel element.

* * * * *